US008301510B2

(12) United States Patent
Boesch

(10) Patent No.: US 8,301,510 B2
(45) Date of Patent: *Oct. 30, 2012

(54) ELECTRONIC COMMERCE FOR SYSTEM REGISTERED CONSUMERS

(75) Inventor: Brian Boesch, Oak Hill, VA (US)

(73) Assignees: Paypal, Inc., San Jose, CA (US); Paypal International Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 12/359,192

(22) Filed: Jan. 23, 2009

(65) Prior Publication Data

US 2009/0132273 A1    May 21, 2009

Related U.S. Application Data

(63) Continuation of application No. 09/240,250, filed on Jan. 29, 1999, now Pat. No. 7,533,064, which is a continuation-in-part of application No. 09/167,873, filed on Oct. 7, 1998, now Pat. No. 6,092,053.

(51) Int. Cl.
G06Q 30/00 (2012.01)
(52) U.S. Cl. ............. 705/26.41; 705/26.1; 705/27.1
(58) Field of Classification Search ............. 705/26, 705/27, 26.1, 26.41, 27.1
See application file for complete search history.

(56) References Cited

U.S. PATENT DOCUMENTS

| 4,799,156 | A | | 1/1989 | Shavit et al. |
| 5,423,043 | A | | 6/1995 | Fitzpatrick et al. |
| 5,668,953 | A | | 9/1997 | Sloo |
| 5,715,314 | A | * | 2/1998 | Payne et al. ............ 705/78 |
| 5,724,424 | A | | 3/1998 | Gifford |

(Continued)

FOREIGN PATENT DOCUMENTS

EP    0680185 A2    11/1995

(Continued)

OTHER PUBLICATIONS

"Start-up makes electronic storefront security push," by Ellen Messmer, Network World, Jan. 19, 1998, vol. 15, Issue 3, p. 27.*

(Continued)

*Primary Examiner* — Jeffrey A Smith
*Assistant Examiner* — Anne Georgalas
(74) *Attorney, Agent, or Firm* — Kenyon & Kenyon LLP

(57) ABSTRACT

A system and method for merchant invoked electronic commerce allowing consumers to purchase items over a network and merchants to receive payment information relating to the purchases. The system includes a server having software which gathers the purchasing information from a consumer to complete a purchasing transaction over a network. The system has a consumer data structure that stores purchasing information for registered consumers. The software is able to access the consumer data structure and enter the consumer's purchasing information during subsequent purchases. Having the software obtain and enter the consumer's purchasing information, the consumer does not have to enter the same information every time they purchase an item over the network. In alternate embodiments, the same technology can be applied to other arenas where a user may have to enter the same repetitive information. In addition, consumers can register with the consumer information server prior to making purchase. In an alternate embodiment, a merchant can gather the purchasing information from a consumer and pass the information to the consumer information server to allow the consumer to register with the consumer information server.

7 Claims, 8 Drawing Sheets

U.S. PATENT DOCUMENTS

| | | | |
|---|---|---|---|
| 5,751,960 A | 5/1998 | Matsunaga | |
| 5,771,355 A | 6/1998 | Kuzma | |
| 5,778,367 A | 7/1998 | Wesinger, Jr. et al. | |
| 5,793,972 A | 8/1998 | Shane | |
| 5,812,668 A | 9/1998 | Weber | |
| 5,815,657 A | 9/1998 | Williams et al. | |
| 5,815,665 A | 9/1998 | Teper et al. | |
| 5,828,840 A | 10/1998 | Cowan et al. | |
| 5,842,178 A | 11/1998 | Giovannoli | |
| 5,850,446 A | 12/1998 | Berger et al. | |
| 5,862,223 A | 1/1999 | Walker et al. | |
| 5,862,325 A | 1/1999 | Reed et al. | |
| 5,864,604 A | 1/1999 | Moen et al. | |
| 5,889,863 A | 3/1999 | Weber | |
| 5,903,652 A | 5/1999 | Mital | |
| 5,903,723 A | 5/1999 | Beck | |
| 5,918,214 A | 6/1999 | Perkowski | |
| 5,931,917 A | 8/1999 | Nguyen et al. | |
| 5,943,424 A | 8/1999 | Berger et al. | |
| 5,950,173 A | 9/1999 | Perkowski | |
| 5,960,411 A * | 9/1999 | Hartman et al. | 705/26 |
| 5,963,924 A | 10/1999 | Williams et al. | |
| 5,974,146 A | 10/1999 | Randle et al. | |
| 5,978,840 A | 11/1999 | Nguyen et al. | |
| 5,983,208 A | 11/1999 | Haller et al. | |
| 5,987,132 A | 11/1999 | Rowney | |
| 5,987,140 A | 11/1999 | Rowney et al. | |
| 5,996,076 A | 11/1999 | Rowney et al. | |
| 6,002,767 A | 12/1999 | Kramer | |
| 6,016,484 A | 1/2000 | Williams et al. | |
| 6,026,379 A | 2/2000 | Haller et al. | |
| 6,029,141 A * | 2/2000 | Bezos et al. | 705/27 |
| 6,061,665 A | 5/2000 | Bahreman | |
| 6,064,979 A | 5/2000 | Perkowski | |
| 6,072,870 A | 6/2000 | Nguyen et al. | |
| 6,088,702 A | 7/2000 | Plantz et al. | |
| 6,088,717 A | 7/2000 | Reed et al. | |
| 6,092,053 A | 7/2000 | Boesch et al. | |
| 6,101,485 A | 8/2000 | Fortenberry et al. | |
| 6,119,105 A | 9/2000 | Williams | |
| 6,134,592 A | 10/2000 | Montulli | |
| 6,144,988 A | 11/2000 | Kappel | |
| 6,163,772 A | 12/2000 | Kramer et al. | |
| 6,163,797 A | 12/2000 | Eckley et al. | |
| 6,178,409 B1 | 1/2001 | Weber et al. | |
| 6,223,213 B1 | 4/2001 | Cleron et al. | |
| 6,246,996 B1 | 6/2001 | Stein et al. | |
| 6,253,027 B1 | 6/2001 | Weber et al. | |
| 6,285,991 B1 | 9/2001 | Powar | |
| 6,286,099 B1 | 9/2001 | Kramer | |
| 6,297,819 B1 | 10/2001 | Furst | |
| 6,304,915 B1 | 10/2001 | Nguyen et al. | |
| 6,324,525 B1 | 11/2001 | Kramer et al. | |
| 6,363,363 B1 | 3/2002 | Haller et al. | |
| 6,373,950 B1 | 4/2002 | Rowney | |
| 6,385,596 B1 | 5/2002 | Wiser et al. | |
| 6,496,744 B1 | 12/2002 | Cook | |
| 6,594,647 B1 | 7/2003 | Randle et al. | |
| 6,651,087 B1 | 11/2003 | Dennis | |
| 6,829,595 B2 | 12/2004 | Justice | |
| 6,862,612 B1 | 3/2005 | Horn et al. | |
| 6,944,669 B1 | 9/2005 | Saccocio | |
| 7,127,677 B2 | 10/2006 | Chou | |
| 7,181,412 B1 | 2/2007 | Fulgoni et al. | |
| 7,269,656 B2 | 9/2007 | Chou et al. | |
| 2002/0004753 A1 | 1/2002 | Perkowski | |

FOREIGN PATENT DOCUMENTS

| | | |
|---|---|---|
| JP | 03053733 A | 3/1991 |
| JP | 05260083 A | 10/1993 |
| JP | 05308376 A | 11/1993 |
| JP | 06021975 A | 1/1994 |
| JP | 06237269 A | 8/1994 |
| JP | 1031635 A | 2/1998 |
| JP | 10340253 A | 12/1998 |
| JP | 11025020 A | 1/1999 |
| WO | 9703410 A1 | 1/1997 |

OTHER PUBLICATIONS

Digital River, "Marketing Software on the Internet: A White Paper," from website http://www.digitalriver.com.

Digital River, "Technology Solutions to Electronic Transactions: A White Paper," from website http://www.digitalriver.com.

Anonymous, Dialog(R) File 9, acc. No. 1029589, Virtual mall opens in Cyberspace, Jun. 1994.

Anonymous, Service to jump start commerce on Internet, Communications Week, Apr. 1994, 3 pages (from Dialog(4) File 16).

Fitzpatrick et al., DERWENT 1995-215007, Jun. 6, 1995 Number of desk-top object creating and monitoring in data processing systems—registering attributes, objects and actions by media association agent and stored in nonvolatile storage.

Definition of Protocols for Secure Anonymous Purchase, Richart, B.; Marti, R.; Delgado, J.; Sadka, A.H.; Sweeney, P.; Autonomic and Autonomous Systems and International conference on Networking and Services, 2005. ICAS-ICNS 2005. Joint International Conference on Oct. 23-25, 2005 pp. 34-34; Digital Object Identifier 10.1109/ICAS/ICNS.2005.39.

An Internet-based system for trading green electricity certificates on small scale; Huld, T.; Halton, D.; Dunlop,E.; Photovoltaic Energy Conversion, 2003. Proceedings of 3rd World Conference on; vol. 3, May 12-16, 2003, pp. 2582-2585, vol. 3 Digital Object Identifier 10.1109/WCPEC.2003.1350118.

Peer-to-peer music-sharing with profit but without copy protection; Grimm, R.; Nutzel, H.; Web Delivering of Music, 2002. WEDELMUSIC 2002. Proceedings. Second International Conference on Dec. 9-11, 2002 pp. 17-22; Digital Object Identifier 10.117/WDM.2002.1176189.

Participation incentive mechanisms in peer-to-peer subscription systems; Lui, S.M.; Lang, K.R.; Kwok, S.H.; System Sciences, 2002. HICSS. Proceedings of the 35th Annual Hawaii International Conference on Jan. 7-10, 2002 pp. 3925-3931.

McKenna, Patrick, Internet Money is Blue Not Green, pp. 1, Jun. 1997.

Bank Technology News, CyberCash Applies A Digital Makeover, pp. 1-2, Oct. 1998.

Moeller Michael, PC Week, IBM Takes Charge of E-Commerce; Plans Client, Server Apps Based on SET; NetCommerce Electronic Commerce System; Product Announcement, Apr. 29, 1996, pp. 118-119.

Freeman, Eva, How to Move E-Cash Around the Internet, pp. 1-2, Jun. 1997.

* cited by examiner

ELECTRONIC COMMERCE FOR SYSTEM REGISTERED CONSUMERS

This is a continuation of U.S. application Ser. No. 09/240,250 filed Jan. 29, 1999, which is a continuation-in-part of U.S. application Ser. No. 09/167,873, filed Oct. 7, 1998, now U.S. Pat. No. 6,092,053.

FIELD OF THE INVENTION

This invention relates generally to a method and system where certain information pertaining to a consumer is stored on a server and is provided to a third party at the request of the consumer. More particularly, the present invention relates to a method and system where certain consumer information is stored on a server and is provided to a merchant thereby allowing the consumer to use an electronic payment system to purchase a product or service over a network in an easy and safe manner.

BACKGROUND OF THE INVENTION

With the emergence of the Internet, consumers and merchants are using the Internet to engage in electronic commerce. To purchase products over the Internet, consumers typically prefer to use electronic payment services. Such services offer a variety of features, including security, privacy, anonymity, and access to transaction histories. The basic model for such services requires a communication link between a consumer's computer and a merchant's computer, and a link between the merchant's computer and a payment server. To use such a payment service, consumers are required to install large amounts of software (commonly called "wallets") onto their computer for the purpose of storing an electronic representation of money or for identifying sources of payments. An example of electronic payment services include such services as SET Specification, HP, CyberCash, IBM, OTP, etc).

If a consumer installs the software for a wallet onto the consumer's computer, the consumer typically has to update the wallet software to correct bugs, to add features, or to improve service performance. Further, the wallet software is accessible only on the computer on which the wallet software is installed. As a result, the consumer must install a copy of the wallet software onto each computer from which the consumer desires to access the payment service.

Once the wallet from a payment service is installed, the consumer may be limited as to where the consumer can shop because of the proprietary nature of the electronic payment service business. Typically a consumer can only purchase a product or service from a merchant who accepts payments from the same payment service. As a result, merchants may opt to use a plethora of payment services thereby raising costs and requiring merchants to manage a variety of software programs.

Present payment services require consumers to go through a large number of steps to complete a transaction. Research has shown that the more steps a consumer is required to take to complete a transaction, the more likely that the consumer will terminate the purchase process prior to completing the purchase. Experience has also shown that, as impressive as wallets may be from a theoretical perspective, consumers don't like them and don't use them. As a consequence, transactions are performed over the Internet in non-secure environments or in inefficient manners, or both.

In order to avoid such problems, some inventions have created new types of systems. One such system requires consumers to use a payment server which sends an access message to a merchant thereby causing the desired product to be sent to the consumer. The access messages include such information as a product identifier and a message authenticator. The message identifier is necessary to identify which product is to be sent and the message authenticator is necessary to ensure that the access message is legitimate. Once the payment server authorizes the transaction, an access message is sent to the merchant. However, these type of systems go against the current mode of operation where merchants determine the authorization of a transaction. Merchants typically want to control the authorization of a transaction in the same manner as they are accustomed to. Presently, if a consumer purchases an item at a store, the merchant controls the authorization of the transaction.

Therefore, a need exists for a system that allows a consumer to send payment information to a merchant's computer over the Internet in a manner that offers security, allows access from any computer that has access to the Internet, delivers payment information to a merchant's computer regardless of the payment system that the merchant uses to process transactions, allows system upgrades without dependency on the consumers, and allows a consumer to register with a consumer information server in advance of a decision to purchase.

SUMMARY OF THE INVENTION

It is therefore an object of the present invention to reduce the number of steps a consumer is required to perform in order to purchase a product over any network.

A further object of the present invention is to reduce the number of steps a consumer is required to perform in order to purchase a product over the Internet.

A further object of the present invention is to eliminate the need for consumers to leave a merchant's site to acquire an electronic form of payment.

A further object of the present invention is to eliminate wallet software which is permanently stored on the consumer's computers.

A further object of the present invention is to create a consumer information server for storing wallet software, that can be accessed easily and transparently by a consumer.

A further object of the present invention is to allow a system administrator of a consumer information server to upgrade the software on such server at any time.

A further object of the present invention is to allow flexibility in providing new or modified services to the consumers via upgrades to software stored on a consumer information server.

A further object of the present invention is to reduce the number of payment parameters consumers are required to fill in when purchasing products over a network.

A further object of the present invention is to allow a consumer to conduct transactions using data stored on a consumer information server from any computer connected to the network on which the consumer information server resides.

A further object of the present invention is to allow consumer information to be provided to merchants using payment systems from various service providers.

A further object of the present invention is to use the architecture of a consumer information server to aid the consumer in distributing all manner of information, not just purchase/money information, to a variety of recipients when those recipients are to receive essentially the same information from one recipient to the next.

A further object of the present invention is to provide a mechanism for direct marketing to consumer wallet holders immediately before, during, or after completion of a transaction using a wallet.

A further object of the present invention is to permit a person to pre register with a consumer information server by providing information to the consumer information server in advance of the need for that information.

A further object of the present invention is to allow a consumer to register with a consumer information server in advance of a decision to purchase a product without having to go through the registration process during the purchasing process.

A further object of the present invention is to allow a consumer information server or merchant to send an email message to a consumer, wherein the email message contains the proper links to the consumer information server to allow a consumer to purchase a product, and if necessary, register with the consumer information server prior to purchasing a product.

A further object of the present invention is to allow a consumer to access a consumer information server to amend the consumer's stored information.

The present invention is a system for presenting a consumer's purchasing information to a merchant's computer to allow a sale of goods or services to be consummated. The system comprises a computer associated with a consumer (the "consumer's computer"), a computer associated with a merchant (the "merchant's computer") and a server (the "consumer information server" or "CIS") on which the necessary and desirable information about the consumer is stored. The consumer's computer, the merchant's computer, and the CIS are connected to a network, such as the Internet, and communicate using communication protocols. The consumer's computer operates Web browser software (the "consumer's browser"). The merchant's computer operates as a web server, provides transaction processing, and performs other functions. The merchant's computer may be a single device, or may, at the merchant's discretion comprise a number devices which may or may not be co-located. The merchant's computer also operates software ("client software") that communicates with the CIS. The CIS operates CIS software which provides access to information stored in various databases, logs, and/or datastructures.

The present invention allows consumers to purchase products over a network and allows merchants to receive payment information relating to that purchase. During the shopping process, a consumer browses a merchant's Web site. The merchant's Web site includes goods and/or services (herein, "item") for sale. The merchant's Web site also operates client software. When the consumer requests a merchant's offer, the client software sends a browser readable file and the merchant's offer to the consumer's browser on the consumer's computer. The merchant's offer comprises in part a transaction number which is not representative of the product code or description. The browser readable file includes an address to the merchant's Web page and instructions that instruct the consumer's browser to communicate with the CIS software. The merchant's offer passes through the consumer's computer to the CIS software.

The CIS software returns a message to the consumer's browser and instructs the consumer's browser to display a graphic within an area reserved for the wallet within the merchant's Web page. The content of this graphic depends on whether or not the consumer is known to the CIS software.

If the consumer is known to the CIS software, the CIS software takes information contained in the merchant's offer, formats the information to allow the consumer's browser to display the merchant's offer, and sends the merchant's offer to the consumer's computer where the merchant's offer is displayed by the consumer's browser within the area reserved for the wallet within the merchant's Web page. The consumer is prompted to decide whether or not to purchase the item. Typically, this communication occurs by the consumer clicking on an object resulting in a message being communicated to the CIS.

If the consumer elects to purchase the item, the CIS software forwards information to the merchant's computer. The information includes information from the merchant's offer and the consumer's personal information (e.g., credit card number, address, shipping address) which is stored on the CIS. The merchant's computer then uses the information to complete the transaction.

If the consumer is unknown to the CIS software, the CIS software sends a form to the consumer's computer which is displayed within the area reserved for the wallet within the merchant's Web page. The form prompts the consumer to provide the purchasing information to complete the transaction. Once the consumer provides sufficient information to complete the transaction, the CIS software prompts the consumer to purchase the item. If the consumer elects to purchase the item, then the consumer is prompted to elect to have the information retained on the CIS for future use (the process herein referred to as "registration"). If the consumer answers "no", then the information is stored in a temporary data structure. Information stored in the temporary data structure is retained for a set amount of time and is not available for reuse by the consumer. If the consumer answers "yes", then the information pertaining to the consumer is stored in a data structure intended for the retention and future use by the consumer.

In an alternative embodiment for consumers who are unknown to the CIS software, merchants can elect to use a merchant's own form instead of the form provided by the CIS software. The merchant's web server software displays the merchant's form which prompts the consumer to provide the purchasing information to complete the transaction. In the preferred embodiment, the consumer is provided the option of registering with the CIS. If the consumer elects to register with the CIS, then the consumer is connected with the CIS thereby allowing the consumer to register with the CIS. The connection to the CIS can be done in any manner known in the art. For example, in one embodiment the merchant's web server software sends the proper links to connect the consumer's browser with the CIS to allow the consumer to register with the CIS. In another embodiment, the merchant's web server software sends an email message to the consumer wherein the email message contains the proper links to the CIS thereby allowing the consumer to register with the CIS.

In the preferred embodiment, the merchant's web server software also sends the consumer's information to the consumer wherein the consumer browser forwards the consumer's information to the CIS. If the consumer's information is forwarded to the CIS, then the CIS software saves the consumer's information in the consumer data structure and the consumer registers with the CIS. If the consumer's information is not forwarded to the CIS, then the consumer follows registers with the CIS using a pre-registration process.

In addition, if there is a problem with the form provided by the CIS, then the merchant's form can be used as a default, thus providing greater assurance that a transaction will not be lost because of a single point of failure.

If the consumer elects to register with the CIS software, during the registration process, the consumer's browser is sent a browser identifier. In the preferred embodiment, the browser identifier is a cookie. The browser identifier contains data which is crypto graphically protected to enhance security. The browser identifier allows the CIS software to identify the consumer's browser and permits a customer to authenticate himself or herself, thereby permitting the CIS software to use the consumer's stored information in future transactions.

The system also allows consumers who are registered on a different browser to authorize the CIS software to use the consumer's stored information. This situation occurs when the CIS software cannot identify the browser identifier because there is no browser identifier in the consumer's browser or the browser identifier cannot be used to identify the particular consumer using the consumer's browser.

Since the system establishes communication links between the merchant's computer and the CIS, the system can be optimized in several respects. For example, the price of an item may be affected by the location to which the item is to be shipped, the method of shipping, and by tax obligations. The CIS software communicates information pertaining to the consumer to the merchant's computer permitting the merchant's computer to determine a "final" price based on the consumer's information, i.e., shipping address and/or preferences.

Another example of optimization is the ability of the CIS software to present a merchant's brand or other "brand" to the consumer's browser. The CIS software can also associate a consumer with an identification code that can be presented to the merchant's computer, thus allowing the merchant to "recognize" a consumer and provide customer-specific messages, displays, and offers. The CIS software can tailor its communication with the consumer's computer in accordance with a profile created by the CIS software. The profile is based upon preferences chosen by the consumer or created by the CIS software based on the consumer's behavior, from preferences chosen by the merchant, by a branding party, or the like.

With respect to consumers, the system is optimized to provide all of the purchasing information to the consumer thereby allowing the consumer to verify the information and make a purchase decision without further purchasing information input from the consumer. The system can also establish a dialogue between the consumer's computer and the CIS to permit the consumer to select from options such as which credit card to use, the shipping address, and the shipping means.

In an alternate embodiment, a consumer can register with the consumer information server prior to purchasing a product or provide information to the consumer information server in advance of need. In one embodiment, the consumer can access the CIS to register with the CIS prior to purchasing a product. In yet another embodiment, the CIS or merchant sends an email message to a consumer wherein the email message contains the proper links to the CIS to allow the consumer to register with the CIS prior to purchasing a product.

In another embodiment, the email message from the merchant comprises a merchant's offer and the proper links to the merchant's Web page where the sale item is described. In the preferred embodiment, the link to the merchant's web page is executed when the email message is opened. In an alternate embodiment, in order to execute the link to the merchant's web page, the consumer must make the connection as known in the art. Once the link to the merchant's web page is executed, the purchase and/or registration process proceeds as previously described.

In yet another embodiment, a known (registered) consumer can access the consumer information server to amend the consumer's stored information.

By allowing a consumer to register or amend the consumer's stored information, the consumer is able to purchase a product without having to go through the registration process during the purchasing process. For example, if a consumer registers with the CIS prior to purchasing a product, then when the consumer goes to a merchant's Web page to purchase a product, the CIS will complete all of the known consumer's purchasing parameters. As a result, the consumer will only have to enter his or her passphrase to complete the transaction.

DETAILED DESCRIPTION OF THE INVENTION

For the purpose of this application, the term software is deemed to include instructions.

Figure 1:
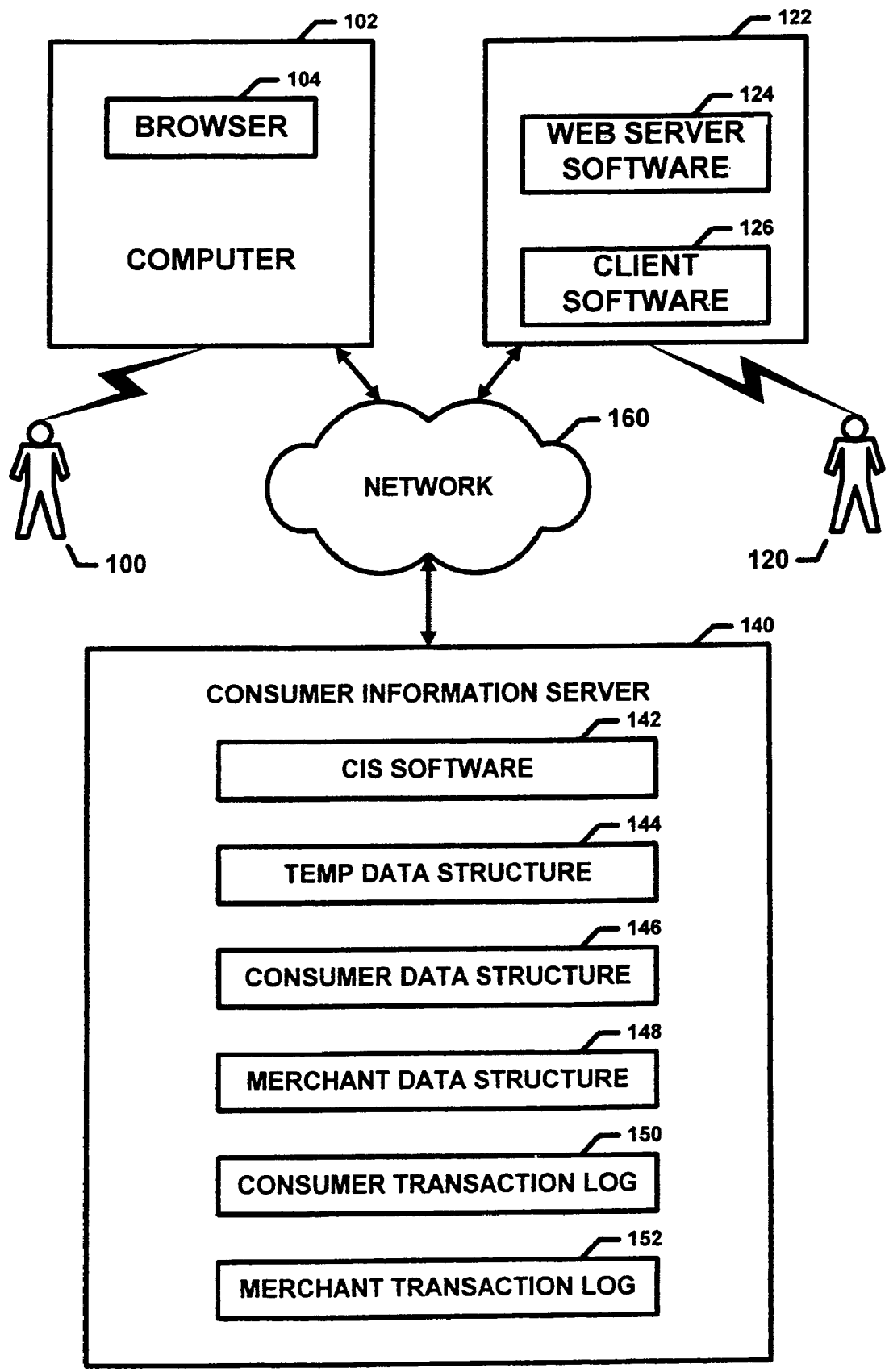
FIG. 1 illustrates the elements of the present invention.

Referring to FIG. 1, the elements of the present invention are illustrated. The present invention allows consumer 100 to purchase a product or service (hereinafter an "item") over network 160 and allows merchant 120 to receive payment information relating to the transaction.

To purchase an item, consumer 100 uses consumer computer 102. Consumer computer 102 operates consumer's Web browser (the "consumer's browser") 104. Consumer's browser 104 allows consumer 100 to download and display Web pages.

To receive payment information relating to the purchase, merchant 120 uses merchant computer 122. Merchant computer 122 operates Web server software 124 and client software 126. Web server software 124 displays a merchant's Web pages. Client software 126 allows merchant 120 to communicate with the Consumer Information Server (the "CIS") 140.

In the preferred embodiment, CIS 140 comprises CIS software 142 which gathers and stores the purchasing information to complete a purchasing transaction over common network 160, temporary data structure 144 which stores consumer information for a limited amount of time and cannot be used in future transactions, consumer data structure 146 which stores consumer information which can be used in future transactions, merchant data structure 148 which stores information pertaining to different merchants, consumer transaction log 150 which stores information pertaining to the transactions for registered consumers, and merchant transaction log 152 which stores information pertaining to transactions for registered and non-registered consumers.

Consumer computer 102, merchant computer 122, and CIS 140 are connected to common network 160. The present invention can operate over various types of common networks both wired and wireless. The present invention can operate over the Internet, intranet, LANS, and WANS however this list should not be construed as a limitation. In the preferred embodiment, the common network is the Internet.

CIS software 142 gathers and stores the purchasing information to complete a purchasing transaction over common network 160. CIS software 142 gathers the purchasing information directly from consumer 100, from consumer data structure 146 or from both. If consumer 100 has not previously registered with CIS software 142, consumer 100 is treated as a non-registered consumer. For non-registered consumers, CIS software 142 gathers the purchasing information by prompting consumer 100 for the information. If consumer 100 is a registered consumer, i.e., a consumer who previously registered with CIS software 142, then CIS software 142 gathers the purchasing information from consumer data structure 146. If additional purchasing information is needed, CIS software 142 prompts consumer 100 for the information.

Temporary data structure 144 stores label-value pairs relating to a particular interaction between consumer 100 and merchant 120. If consumer 100 is not known to CIS software 142 (discussed below), consumer 100 is prompted for purchasing information to complete the transaction. The purchasing information can include the customer's name, billing address, shipping address, and credit card number, however this information should not be construed as a limitation. In the preferred embodiment, the purchasing information is stored in temporary data structure 144 which is located at CIS 140. In alternative embodiments, the purchasing information can be stored on a dedicated server or a shared server.

If consumer 100 declines to have purchasing information stored at CIS 140, the purchasing information remains in temporary data structure 144 for a set period of time. The purchasing information in temporary data structure 144 is not available to consumer 100 for future transactions. If consumer 100 elects to have purchasing information stored at CIS 140, the purchasing information in temporary data structure 144 will be saved for subsequent use in consumer data structure 146.

Consumer data structure 146 stores label-value pairs relating to consumers, including consumer 100, that have completed the registration process with the operator of CIS 140. The label-value pairs in consumer data structure 146 represent information that is necessary, and may include information that is useful to complete a transaction. The purchasing information can include the customer's name, billing address, shipping address, and credit card number, however this information should not be construed as a limitation. The useful information can also include email, telephone numbers, facsimile numbers, and user preference data (regarding shipping address, shipping method, and related data), however this information should not be construed as a limitation.

Merchant data structure 148 stores label-value pairs relating to merchants, including merchant 120, that have completed the registration process with the operator of CIS 140. The label-value pairs in merchant data structure 148 represent information that is necessary to identify merchant 120 and merchant computer 122. This information includes contact information, merchant identification number, network location(s) for the merchant computer 122, payment card type, accepted currencies, and payment methods (e.g., electronic check, micropayments), however this information should not be construed as a limitation.

Consumer transaction log 150 stores label-value pairs relating to transactions performed by registered consumers. Merchant transaction log 152 stores label-value pairs relating to transactions performed by registered and non-registered consumers, including consumer 100. The operator of CIS software 142 can allow consumers and merchants access to the information contained in their respective data structures as deemed necessary. For instance, consumer 100 can be given a summary of the consumer's transactions over a period of time. Merchant 120 can be given a summary of the merchant's transactions over a period of time.

Figure 2A:
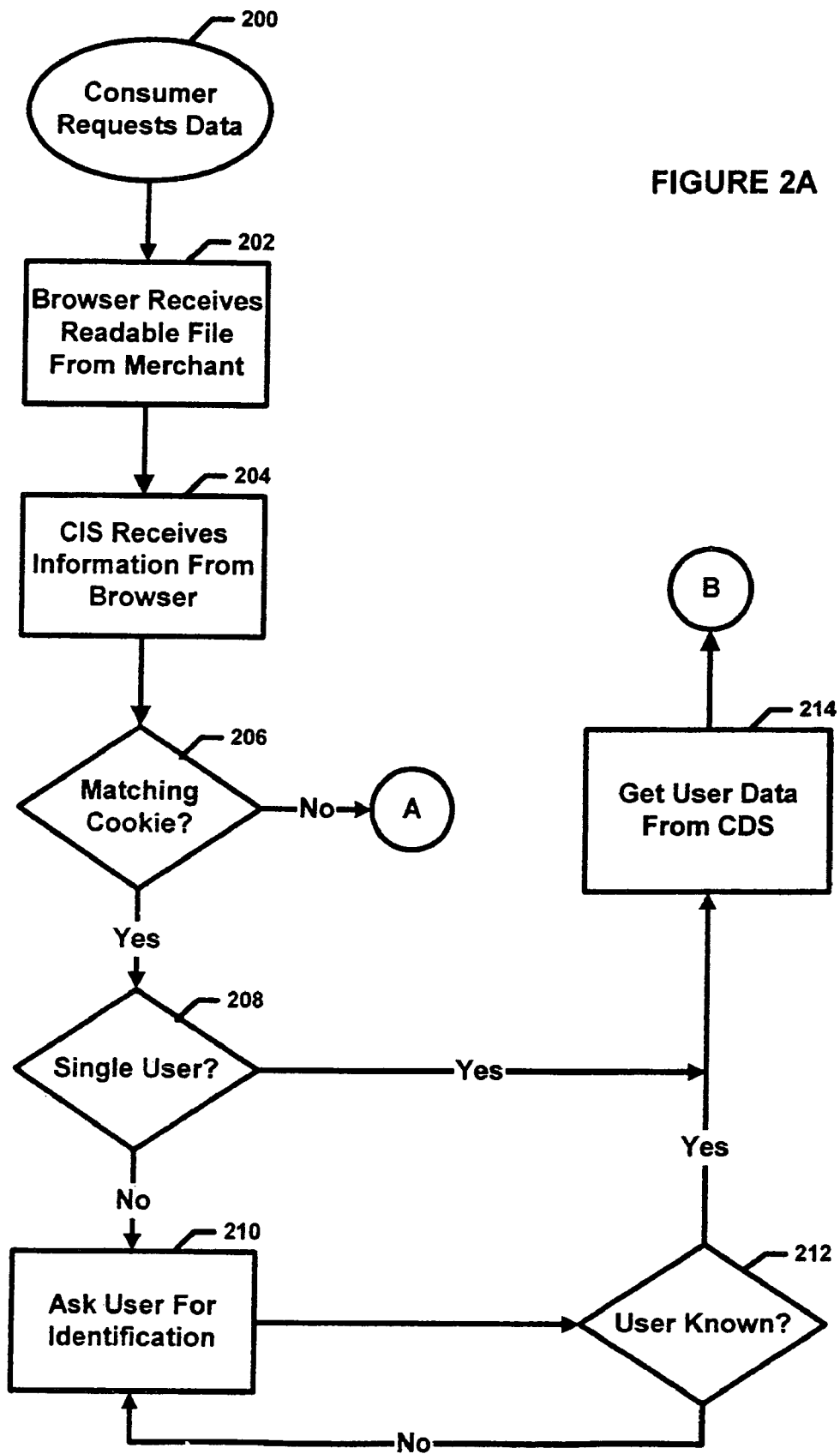
FIG. 2A illustrates the process of purchasing an item over a network.

Referring to FIG. 2A, the process of purchasing an item over a network is illustrated. The following process is the preferred embodiment of the present invention, in alternate embodiments, similar processes can occur in different orders. In the preferred embodiment, the process starts with a consumer requesting a merchant's offer 200 from a merchant. In response to the consumer's request, the merchant's computer responds by sending a browser readable file and the merchant's offer to the consumer's computer 202. The consumer's browser processes the browser readable file and sends the merchant's offer and a message to the CIS 204.

The merchant's offer includes the following information, however this information should not be considered a limitation: merchant identifier, price of the item, a form of digital signature of the merchant, a final price indicator, and a transaction number. The merchant identifier identifies the merchant who is offering the item for sale. The price of the item is cost to purchase the item. A digital signature of the merchant is used to ensure the validity of the offer. The final price indicator is used to indicate whether the final cost for the item is affected by the consumer's shipping address and/or shipping preference. The transaction number is used for tracking purposes. The transaction number does not contain any product identifying information. The transaction number acts as an identifier for identifying a transaction.

The message sent from the consumer's browser to the CIS indicates whether the browser contains a browser identifier. In the preferred embodiment, the browser identifier is a cookie. A browser identifier identifies the consumer browser on a specific consumer computer. The CIS software receives and processes the message to determine if the consumer's browser contains an identifier which identifies a consumer that matches a data entry in a file in the consumer data structure of the CIS 206. The CIS software determines whether a single user or multiple users have used the consumer's browser 208 by checking the consumer data structure. If the CIS software identifies only one user, then the CIS software accesses and gathers the consumer's information for the identified user which is stored in the consumer data structure (CDS) 214. If the CIS software identifies more than one user, the CIS software will select a user based on a selection criteria generated by the operator of the CIS. If the user selected by the CIS software is not the current user and the current user objects, then the consumer is asked for identification 210. If the current user does not object, as described below, the current user cannot complete a transaction unless the current user enters the proper passphrase which belongs to the selected user. This process requires the CIS software to send a message to the consumer's computer prompting the consumer to provide information to identify the consumer. In the preferred embodiment, the CIS software prompts the consumer for the consumer's identification number, email address, and a passphrase. The consumer's identification number, email address, and passphrase are used to authenticate the consumer. These entries were provided by the consumer during the registration process which is discussed below. In alternate embodiments, the consumer can be prompted for different information to identify the consumer.

The consumer's response is sent back to the CIS where the CIS software then determines if the consumer is known to the CIS software 212. A known or registered consumer is a consumer who has previously registered with the CIS software and whose information matches information supplied by the consumer during a prior registration. If the CIS software determines that the information provided by the consumer is insufficient to identify the consumer, then the CIS software prompts the consumer for the same information again 210. The operator of the CIS can set the number of iterations that the consumer is prompted for the consumer's identity. If the consumer's response matches the information the consumer supplied during registration, then the CIS software accesses and gathers the consumer's information which is stored in the consumer data structure (CDS) 214.

In an alternative embodiment, the system can include a plurality of CISs. In such a system, the consumer would be registered on one of the CISs. If the CIS software determines that the information provided by the consumer does not match the information on the CIS the consumer is connected to, then the CIS software will communicate with the other CISs to identify the consumer and obtain the consumer's information. In the preferred embodiment, the CISs are linked together via the network and are able to search one another for information in the event that a request to one CIS does not yield the requested information.

Figure 2B:
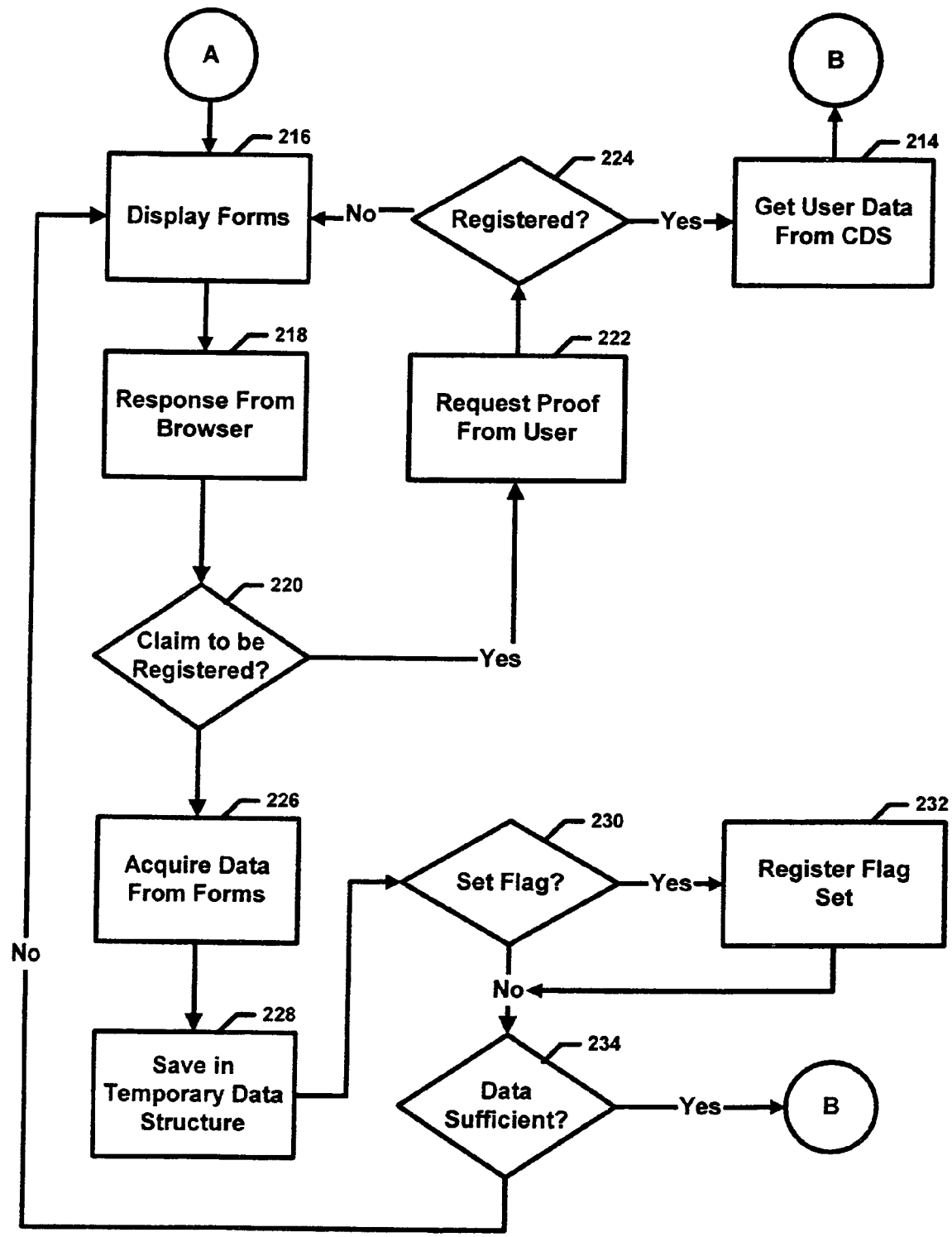
FIG. 2B illustrates the process of purchasing an item over a network (continued).

Referring to FIG. 2B, if the consumer's browser does not contain a browser identifier or if the information the consumer provided does not properly identify the consumer, i.e., the consumer is not found in a file in the consumer data structure of the CIS, the CIS software prompts the consumer for the purchasing information 216. This is accomplished by the CIS software sending a form to the consumer's browser. In an alternative embodiment, the consumer is prompted for the purchasing information using a plurality of forms. The form or forms prompts the consumer to provide the purchasing information to complete the transaction. The purchasing information includes the consumer's name, address, shipping address, and credit card number, however this list should not be construed as a limitation. In the preferred embodiment, the consumer has the option of indicating that the consumer is a registered consumer.

The consumer's response or responses are sent to the CIS 218. The CIS software then determines if the consumer claims to be a registered consumer 220. If the consumer claims to be a registered consumer, then the CIS software prompts the consumer for proof 222. In the preferred embodiment, this is accomplished by the CIS software prompting the consumer for the consumer's identification number, email address, and a passphrase. The consumer's identification number, email address, and passphrase are used to authenticate the consumer. These entries were provided by the consumer during the registration process which is discussed below. In alternate embodiments, the consumer can be prompted for different information to identify the consumer.

The consumer's response for proof is sent back to the CIS where the CIS software then determines if the consumer is a registered consumer 224. Again, a registered consumer is a consumer who has previously registered with the CIS software and whose information supplied by the consumer matches information supplied by the consumer during a prior registration.

If the CIS software determines that the information provided by the consumer matches the information the consumer supplied during registration, then the CIS software accesses and gathers the consumer's information which is stored in the consumer data structure (CDS) 214.

If the CIS software determines that the information provided by the consumer is insufficient to identify the consumer, then the CIS software prompts the consumer for the purchasing information to complete the transaction 216.

If the consumer does not claim to be registered then the CIS software acquires the consumer's data from the forms 226. In addition, the consumer's response can be sent to the merchant to determine whether the item can be sold to that consumer. For instance, a consumer in one state may not be able to purchase a firearm if the law governing the consumer or merchant does not permit such a transaction. In yet another embodiment, the consumer response to one question can lead to another question which requires another form. For instance, if the consumer requests overnight shipping, the CIS software can prompt the consumer to select the overnight shipping service.

The CIS software stores the data in a temporary data structure 228. The data is evaluated to determine if the consumer elected to register with the CIS 230. If the consumer elects to become a registered consumer, then the CIS software sets the flag 232. If the consumer does not elect to become a registered consumer then the flag is not set. Registration allows the CIS software to access the consumer's information which was previously stored in the consumer data structure. The information acquired from the forms is evaluated to determine if the information from the consumer is sufficient to complete the purchase transaction 234. This step includes the CIS software accessing the merchant data structure using the merchant identifier to ensure that the consumer's purchasing information is in proper order, i.e., to check that the consumer's credit card accepted by the merchant. If the information is not sufficient, the consumer is prompted for the information again 216. The operator of the CIS can set the number of iterations that the consumer is prompted for the information.

Figure 2C:
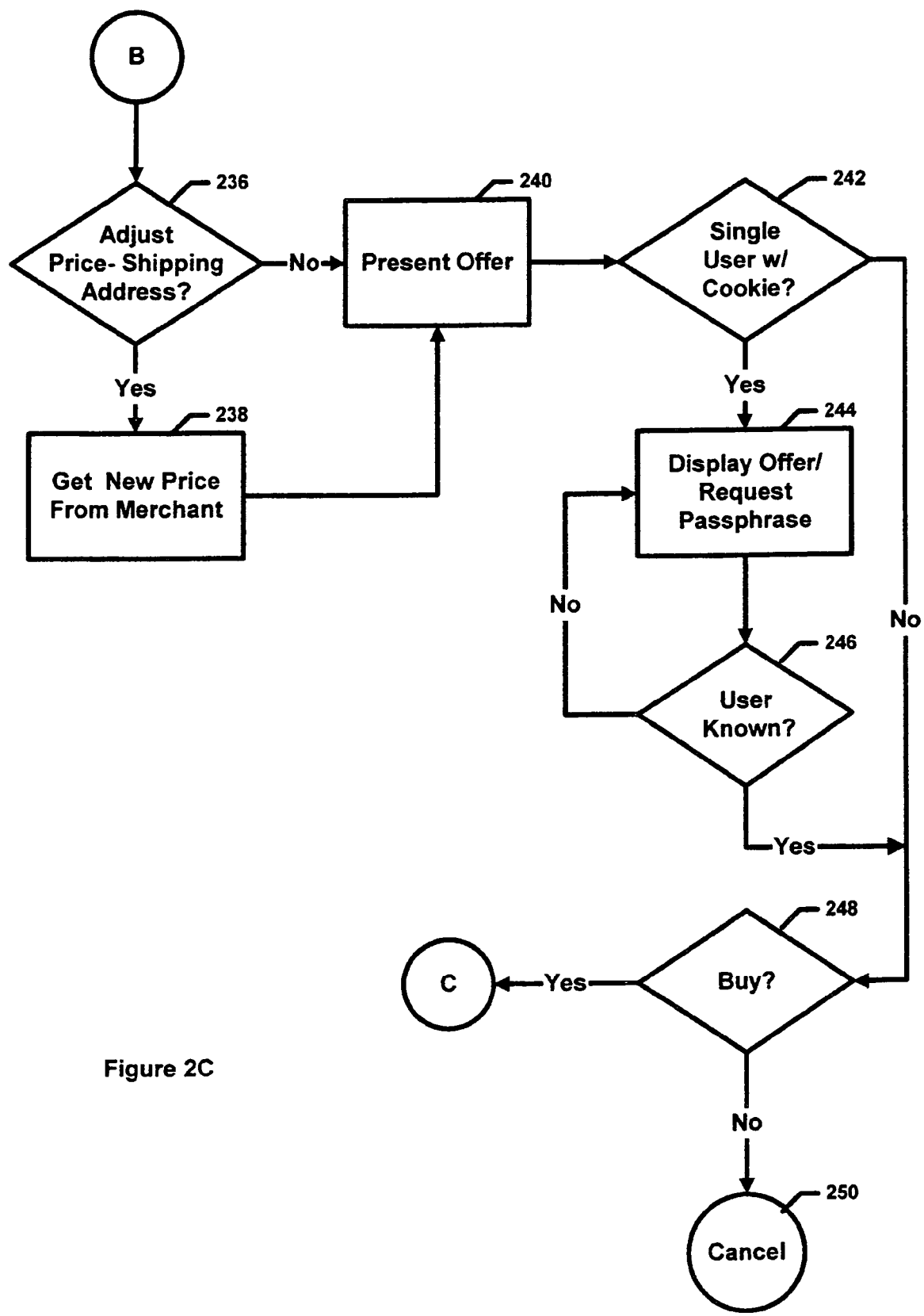
FIG. 2C illustrates the process of purchasing an item over a network (continued).

Referring to FIG. 2C, once the CIS software determines that the consumer's information is sufficient to complete the purchase transaction, the CIS software reads the final price indicator in the merchant's offer to determine if the price needs to be adjusted due to the consumer's shipping address and/or shipping preference 236. If the price is affected by the consumer's shipping address and/or shipping preference, then the CIS software communicates the required information to the merchant to calculate a new price based on the consumer's shipping address 238. In the preferred embodiment, the CIS software only sends the city, state, country, and mail code information to the merchant's computer. This information is limited to permit the revised price calculation without having to disclose personal information relating to the consumer.

In alternate embodiments, the consumer's address can be the consumer's email address or a facsimile number.

Once the merchant responds with the revised price or if the price was not affected, the CIS software presents the merchant's offer to the consumer 240. The merchant's offer is displayed to the consumer in the area reserved for the wallet. The CIS software then determines if the consumer needs to enter a passphrase. If the consumer is a registered consumer who has not gone through the authentication process yet, then the consumer is required to enter the proper passphrase for the consumer identified with the browser identifier (cookie) 242. The offer is then augmented with a prompt for the user to enter the consumer's passphrase 244. The CIS software evaluates the entered passphrase against data held in the consumer data structure 246 to determine if the consumer is known (registered) by the CIS software. If the passphrase does not match, then the consumer is prompted for the correct passphrase 244.

The operator of the CIS can set the number of iterations that the consumer is prompted for a correct passphrase to avoid multiple fraudulent attempts to access information.

Once the consumer enters a correct passphrase or if there was no browser identifier for the consumer, the consumer is presented with a buy decision 248. The consumer has several options available at this step: the consumer can elect to buy the item, change the consumer's information and buy the item, or cancel the transaction. If the consumer elects to change the consumer's information, the consumer must still decide to either buy the item or cancel the transaction after changing the information. If the consumer declines to purchase the item, then the transaction is canceled, then the information held in the temporary data structure is deleted, the dialogue ends and the transaction is terminated 250.

The consumer also has the option of changing the consumer's information. The consumer may wish to change such information for such reasons as the consumer does not agree with the selection by the CIS software or the information contains an error. For instance, if the consumer wishes to change the shipping address, the consumer can enter a new shipping address. In some instances, the consumer can have a plurality of possible entries into the same information block with a preferred entry. In such a situation, the CIS software chooses the preferred information to enter into the information block. The CIS software chooses the information via any selection process known in the art, such as most popular, last used, first used, etc. However, the CIS software cannot enter information into an information block if the merchant will not allow such an entry. For instance, a merchant may only accept the ACME credit card and the consumer has not previously used an ACME credit card to purchase an item using the present invention. In such a situation the CIS software prompts the consumer to provide an acceptable form of payment. Information options are available to the consumer in the form of directory of addresses, shippers, shipping methods, credit cards, and other information options.

Figure 2D:
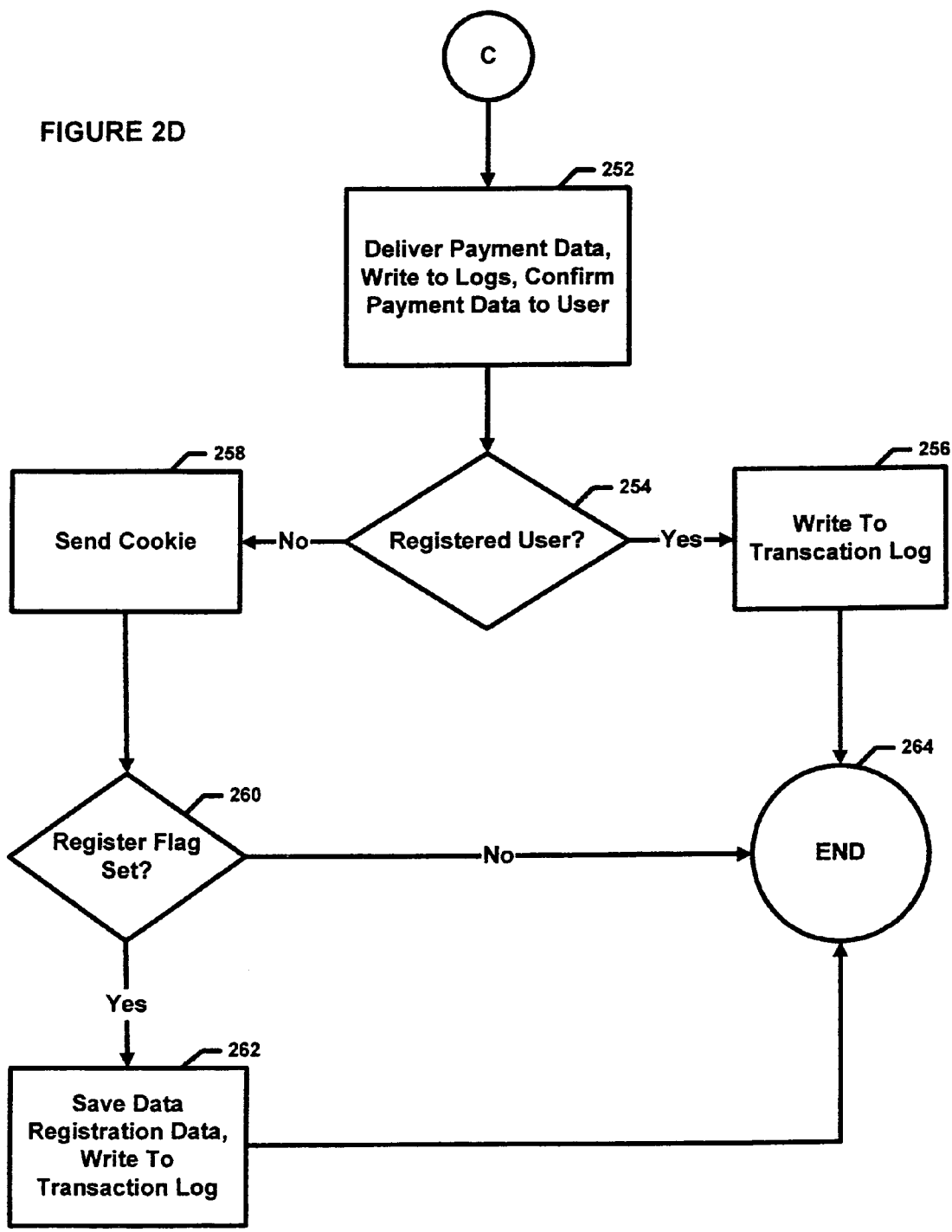
FIG. 2D illustrates the process of purchasing an item over a network (continued).

Referring to FIG. 2D, if the consumer elects to purchase the item, then the information regarding the transaction is delivered to the merchant's computer, information is written to the merchant transaction log, and a message confirming the transaction is sent to the consumer's computer 252. The CIS software then determines if the consumer is registered 254. If the consumer is a registered consumer, then the information regarding the transaction is written to the consumer transaction log 256.

If the consumer is non-registered consumer, i.e, not known to the CIS software, then a browser identifier (i.e., a cookie) is sent to consumer's computer 258 and CIS software determines if the register flag was set 260. If the register flag is set, then the information stored in the temporary data structure pertaining to the consumer is transferred to the consumer data structure for subsequent uses, the consumer is prompted for a passphrase, and the CIS software saves the transaction data to the consumer transaction log 262. If the register flag is not set, the transaction data remains in the temporary data structure until it is discarded but is unavailable for future use. The transaction process ends 264.

Figure 2E:
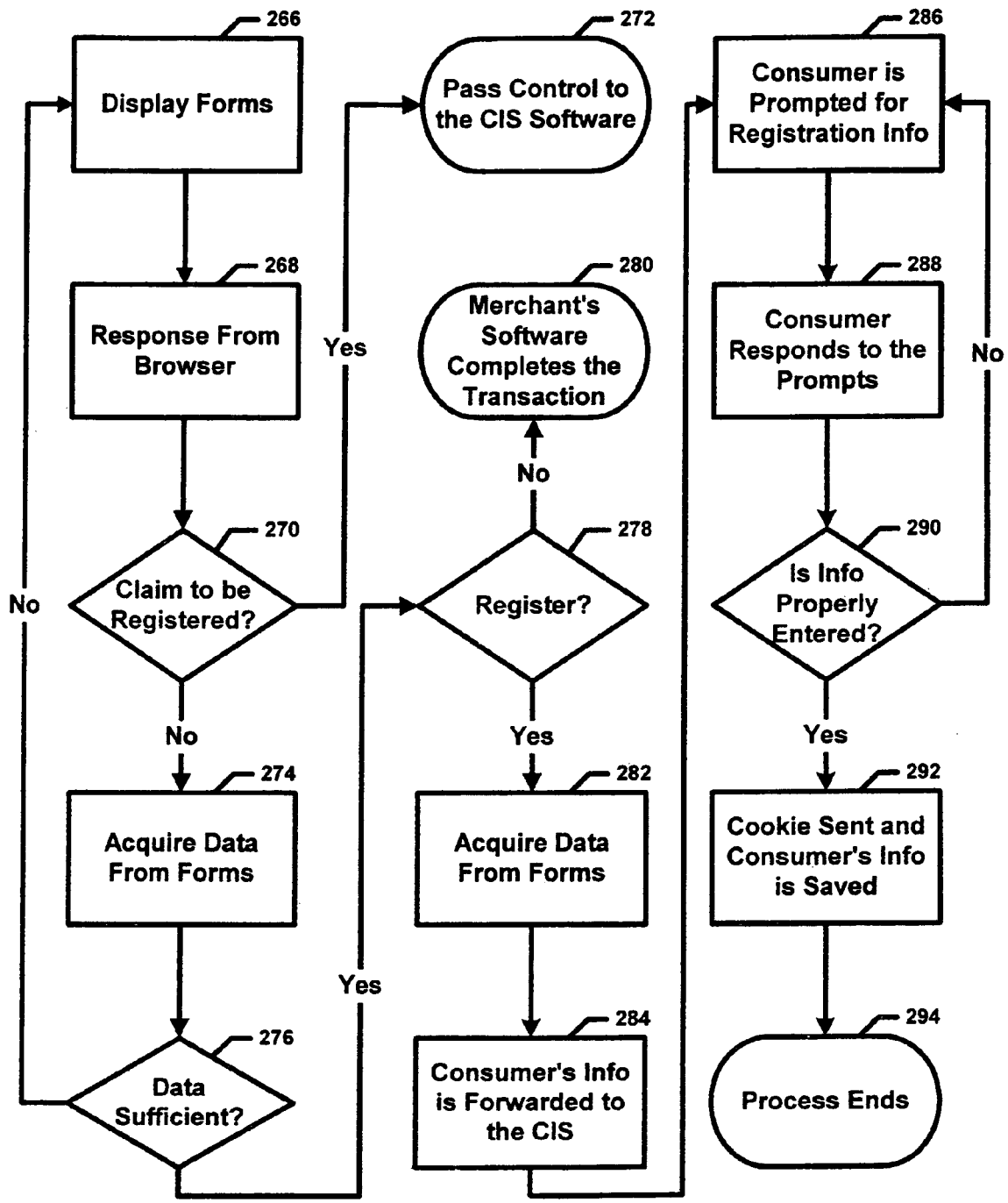
FIG. 2E illustrates the process of a merchant using a merchant's form for gathering purchasing information (continued).

Referring to FIG. 2E, the process of a merchant using the merchant's form for gathering purchasing information is illustrated. In the preferred embodiment, the merchant's web server software performs several different functions including gathering purchasing information from a consumer. However in an alternate embodiment, the gathering of purchasing information is performed by software which interacts with the merchant's server software.

A merchant can use a merchant's form to gather purchasing information from a consumer if the consumer is unknown to the CIS software, i.e., no matching cookie. The merchant uses the merchant's form to gather the consumer information which is needed to complete the transaction. Using at least one merchant's form, the merchant's web server software prompts the consumer for the purchasing information 266. The purchasing information includes the consumer's name, address, shipping address, and credit card number, however this list should not be construed as a limitation. The consumer responds to the prompts and the consumer's responses are sent to the merchant 268.

In the preferred embodiment, the consumer has the option of indicating that the consumer is a registered consumer. The merchant's web server software determines if the consumer claims to be a registered consumer 270. If the consumer claims to be a registered consumer, the merchant's offer is forwarded to the CIS, control is passed off to the CIS software and the CIS software gathers the consumer's information as described earlier 272. If the consumer does not claim to be a registered consumer, then the merchant's web server software acquires the consumer's data from the forms 274. In the preferred embodiment, the merchant's web server software determines whether the item can be sold to the consumer. For instance, a consumer in one state may not be able to purchase a firearm if the law governing the consumer or merchant does not permit such a transaction. In yet another embodiment, the consumer response to one question can lead to another question which requires another form. For instance, if the consumer requests overnight shipping, the CIS software can prompt the consumer to select the overnight shipping service.

The merchant's web server software evaluates the information acquired from the forms to determine if the information from the consumer is sufficient to complete the purchase transaction 276. If the information is not sufficient, the consumer is prompted for the information again 266.

In the preferred embodiment, the consumer is provided the option of registering with the CIS. The data is evaluated to determine if the consumer elected to register with the CIS 278. If the consumer does not elect to register with the CIS, then the merchant's web server software completes the transaction 280.

If the consumer elects to become a registered consumer, then the merchant's web server software connects the consumer to the CIS 282. In an alternate embodiment, the merchant's offer is forwarded to the CIS. The connection can be established in any manner as known in the art. For example, in one embodiment the merchant's web server software sends the proper links to connect the consumer's browser with the CIS to allow the consumer to register with the CIS. In another embodiment, the merchant's web server software sends an email message to the consumer wherein the email message contains the proper links to the CIS to allow the consumer to register with the CIS.

In the preferred embodiment, the merchant also sends the consumer's information to the consumer which the consumer browser forwards to the CIS 284. The CIS software then prompts the consumer for the consumer's registration information 286. In the preferred embodiment, the registration information includes the consumer's identification number, email address, passphrase, default payment parameters, default shipping address, and default shipping means, however this list is not meant as a limitation. In alternate embodiments, the registration can include different information.

The consumer responds by entering his or her registration information in response to the prompted questions 288. The CIS software checks the entered registration information to ensure that the consumer's responses have been entered correctly 290. In the preferred embodiment, the consumer only has to enter information for the consumer's identification number, email address and passphrase.

If any of the consumer's responses are not entered correctly, the CIS software prompts the consumer to reenter the information again 286. If the consumer's responses are properly entered, then the CIS software sends a cookie to the consumer's browser and stores the consumers responses in the consumer data structure (CDS) 292. The registration process ends once the consumer's responses are stored 294. In alternate embodiments, the CIS software sends the consumer a message informing the consumer that the information was stored.

If the consumer's information is not forwarded to the CIS, then the consumer follows the pre-registration process which is described below (see FIG. 3).

In addition, if there is a problem with the form provided by the CIS, then the merchant's form can be used as a default, thus providing greater assurance that a transaction will not be lost because of a single point of failure.

Figure 3:
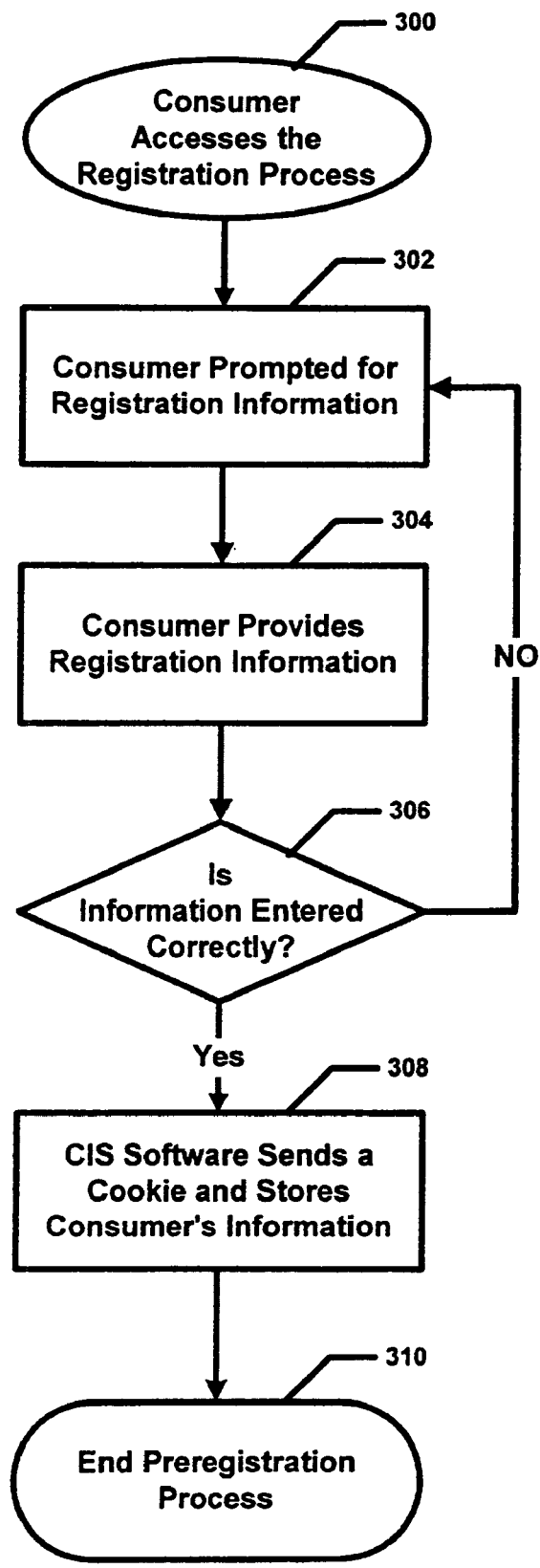
FIG. 3 illustrates the process of a consumer registering with the consumer information server.

Referring to FIG. 3, the process of pre-registration is illustrated. Pre-registration is the process of a consumer going through the registration process prior to purchasing a product or in the case where the CIS is a repository for non-financial information, the process during which information is provided by a user in advance of the need for that information. By preregistering, a consumer is able to purchase a product without having to go through the registration process during the purchasing process. The process starts with a consumer accessing the registration process on the CIS 300. This can be done either by the CIS or a merchant sending an email message to the consumer, wherein the email message contains the proper links to the consumer information server, or by the consumer accessing the CIS directly.

In the preferred embodiment, the proper links are the Internet address for the registration process on the CIS. If the email message is sent by a merchant, the message could also contain purchase information for an item. For example, the message could contain the merchant's URL, a coupon for use on the merchant's website, as well as additional purchasing information. The consumer clicks on the Internet address for the CIS and the consumer's browser connects the consumer to the CIS to allow the consumer to register with the CIS. If the merchant sent the email message containing purchasing information, then this information is forwarded to the merchant's computer and eventually is included in the merchant's offer.

In another embodiment, the email message from the merchant comprises a merchant's offer and the proper links to the merchant's Web page where the sale item is described. In the preferred embodiment, the link to the merchant's web page is executed when the email message is opened. In an alternate embodiment, in order to execute the link to the merchant's web page, the consumer must make the connection as known in the art. In another embodiment, the consumer enters either the Internet address for the CIS or the Internet address for the registration process on the CIS. Once the link to the merchant's web page is executed, the purchase and/or registration process proceeds as previously described.

In another embodiment, the email message contains connection software which connects the consumer to the CIS. In one embodiment, the connection software is part of the email message. In another embodiment, the connection software is in a file attached to the email message. In another embodiment, the consumer enters either the Internet address for the CIS or the Internet address for the registration process on the CIS.

Once the consumer accesses the CIS, the CIS software prompts the consumer for registration information 302. In the preferred embodiment, the registration information includes the consumer's identification number, email address, passphrase, default payment parameters, default shipping address, and default shipping means, however this list is not meant as a limitation. In alternate embodiments, the registration information can include different information.

The consumer responds by entering his or her registration information in response to the prompted questions 304. The CIS software checks the entered registration information to ensure that the consumer's responses have been entered correctly 306. In the preferred embodiment, the consumer only has to enter information for the consumer's identification number, email address and passphrase.

If any of the consumer's responses are not entered correctly, the CIS software prompts the consumer to reenter the information again 302. If the consumer's responses are properly entered, then the CIS software sends a cookie to the consumer's browser and stores the consumers responses in the consumer data structure (CDS) 308. The preregistration process ends once the consumer's responses are stored 310. In alternate embodiments, the CIS software sends the consumer a message informing the consumer that the information was stored.

Figure 4:
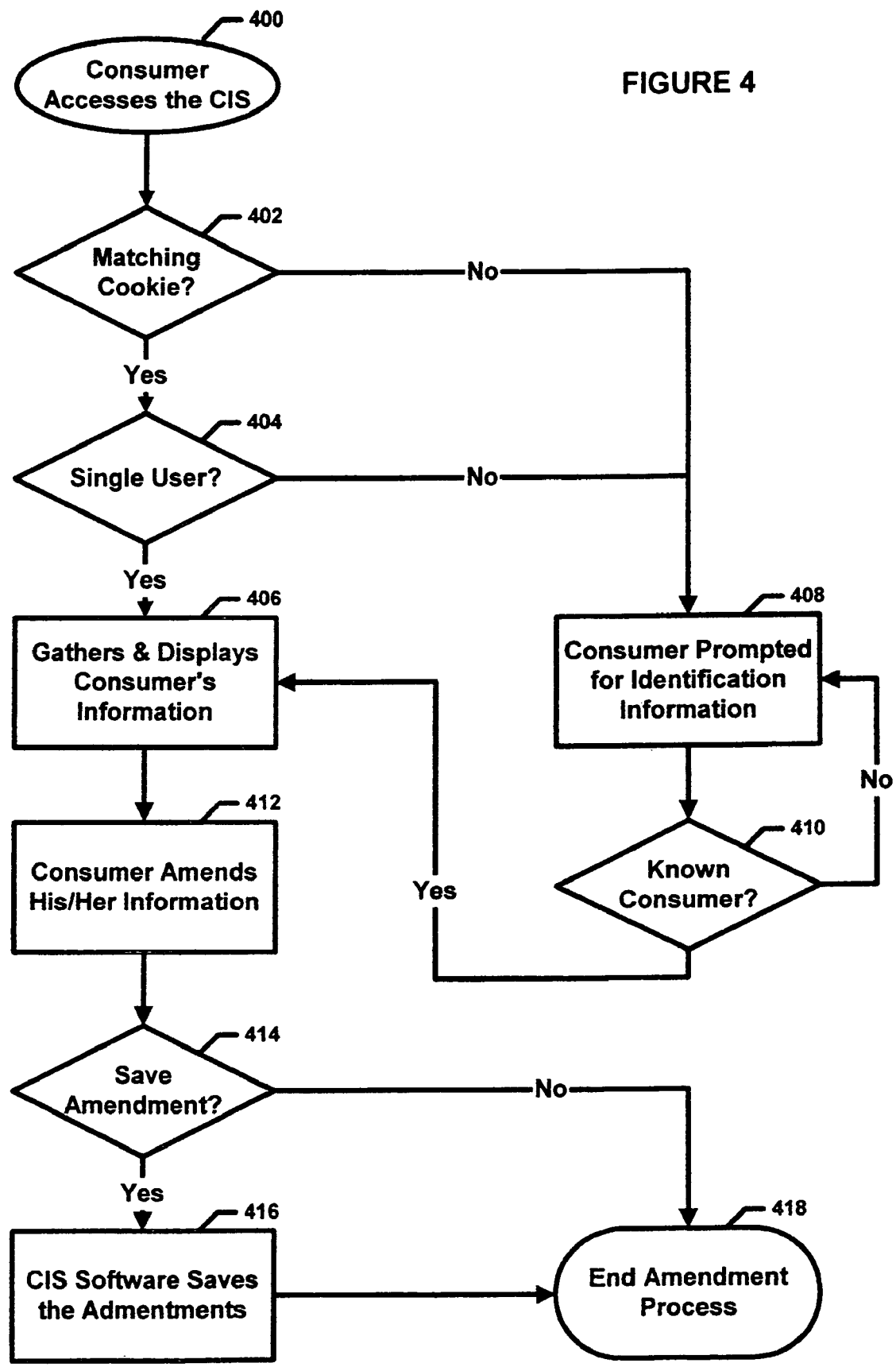
FIG. 4 illustrates the process of a consumer amending his or her consumer information.

Referring to FIG. 4, the process for amending a consumer's stored information is illustrated. The process starts with a consumer accessing the CIS to amend his or her stored information 400. The CIS software responds by checking the consumer's browser for a browser identifier and for determining if the browser identifier identifies a consumer that matches a data entry in a file in the consumer data structure of the CIS 402. In the preferred embodiment, the browser identifier is a cookie. A browser identifier identifies the consumer browser on a specific consumer computer.

If the browser identifier does match, then the CIS software determines whether a single user or multiple users have used the consumer's browser 404 by checking the consumer data structure. If only a single user has used the consumer's browser, then the CIS software accesses and gathers the consumer's information from the CDS and displays the information to the consumer 406.

If the browser identifier does not match, there is no browser identifier, or if there are multiple users of the consumer's browser, then the CIS software prompts the consumer for the consumer's identification information 408. The consumer's identification information includes the consumer's identification number, email address and passphrase which are used to authenticate the consumer. These entries were provided by the consumer during the registration process. In alternate embodiments, the consumer is prompted for different information to identify the consumer.

The consumer's response is sent back to the CIS where the CIS software then determines if the consumer is known to the CIS software 410. A known or registered consumer is a consumer who has previously registered with the CIS software and whose information matches information supplied by the consumer during a prior registration.

If the CIS software determines that the information provided by the consumer is insufficient to identify the consumer, then the CIS software prompts the consumer for the identification information again 408. The operator of the CIS can set the number of iterations that the consumer is prompted for the consumer's identity.

If the consumer's response matches the information the consumer supplied during registration, then the CIS software accesses and gathers the consumer's information which is stored in the consumer data structure (CDS) and displays the information to the consumer 406.

The consumer's browser displays the consumer's information to the consumer who can amend the consumer's information using techniques known in the art 412. The consumer is able to add, delete or modify the consumer's information. Once the consumer completes his or her amendments, the consumer selects to either save or cancel the amendments 414.

If the consumer elects to cancel the amendments, the amendment process ends 418. If the consumer elects to save the amended consumer's information, then the CIS software stores the amended consumer's information in the consumer data structure 416. Once, the CIS software saves the amended consumer's information, the amendment process ends 418.

Although the above description is directed at purchasing an item over the Internet, the same concept of distribution of information can be applied to other areas. In an alternative embodiment, the consumer can be an accessee, the merchant can be an accessor, the consumer information server can be an information server (IS), the consumer data structure can be an accessee data structure, the merchant data structure can be an accessor data structure, the consumer transaction log can be an accessee transaction log, and the merchant transaction log can be an accessor transaction log. The accessee can authorize the software on the IS to provide information to an accessor. For instance, the accessee can be a prospective applicant applying for admission into an educational institution such as a college or a university. In this case, the prospective applicant stores an entire range of information on the IS where the information is relevant to the initial screening for college applications. For example, SAT scores, addresses for references, personal information, responses to questions of desired major or subject area would be information stored on the IS. This information could then be supplied to colleges whose Web sites could access the IS for the desired information.

In yet another embodiment, the accessee can be a potential mortgage borrower, the accessor can be a mortgage lender, and the information stored on the IS can be the accessee's financial information. The accessee can authorize the software on the IS to provide the accessor the information stored on the IS to allow the accessee to apply for a mortgage or to get a quote. Again, the accessee would provide a wide range of data necessary for the mortgage application process. The information can include the accessee's credit reports, bank statements, employment record, and other credit related information.

In all of these different type of embodiments, the communications between the different parties can be encrypted in any manner known in the art. In addition, some of the communications can be accomplished in different manners. For example, in an alternate embodiment of the preferred embodiment, communications between the CIS and the merchant computer can occur using a separate communication link. The communication link can be a direct link between the merchant and the CIS. Using this separate link can ensure against unauthorized transactions.

Although the present invention has been described in detail for purpose of illustration, it is understood that such detail is solely for that purpose, and variations can be made therein by those skilled in the art without departing from the scope of the invention. The preceding descriptions of the operations of the present invention are merely illustrative. In various embodiments of the disclosed inventions operational steps may be added, eliminated, performed in parallel or performed in a differing order. The apparatus and process of the present invention is defined by the following claims.

I claim:

1. In a system for conducting electronic transactions with any of a plurality of merchants over a network, a consumer information server configured to:
   receive a connection request based on a communication from a merchant computer which has compiled purchase information based on a request for a consumer transaction;
   determine whether the consumer information server contains registration information to complete the consumer transaction with the merchant computer;
   if the consumer information server does not have the registration information, send a request for the registration information;
   receive the registration information in response to the request, the registration information including a consumer identification number, a consumer electronic mail address, and consumer payment information;
   store the registration information; and
   if the consumer information server contains the registration information, enable the system in subsequent consumer transactions without requiring that the consumer register separately with respective merchants.

2. The system of claim 1, wherein the connection request includes an Internet address of the consumer information server.

3. The system of claim 1, wherein the registration information includes a consumer passphrase.

4. The system of claim 3, wherein the registration information includes a consumer shipping address.

5. The system of claim 4, wherein the registration information includes a consumer shipping method.

6. The system of claim 1, the consumer information server further configured to:
   check the registration information for errors; and
   send a cookie.

7. The system of claim 1, the consumer information server further configured to:
   send an electronic mail message indicating that the registration information was stored.

* * * * *